United States Patent
Hanhinen et al.

(10) Patent No.: US 7,431,143 B2
(45) Date of Patent: Oct. 7, 2008

(54) CONTROLLING FEEDING OF SOLID MATTER

(75) Inventors: Jaakko Hanhinen, Tampere (FI); Heikki Imelainen, Tampere (FI); Taneli Mutikainen, Tampere (FI)

(73) Assignee: Metso Automation OY, Helsinki (FI)

( * ) Notice: Subject to any disclaimer, the term of this patent is extended or adjusted under 35 U.S.C. 154(b) by 440 days.

(21) Appl. No.: 10/525,076

(22) PCT Filed: Sep. 24, 2003

(86) PCT No.: PCT/FI03/00695

§ 371 (c)(1),
(2), (4) Date: Jul. 7, 2005

(87) PCT Pub. No.: WO2004/029745

PCT Pub. Date: Apr. 8, 2004

(65) Prior Publication Data

US 2006/0180358 A1 Aug. 17, 2006

(30) Foreign Application Priority Data

Sep. 25, 2002 (FI) ................................ 20021712

(51) Int. Cl.
*B65G 47/00* (2006.01)
(52) U.S. Cl. .................. 198/550.6; 222/55; 198/635
(58) Field of Classification Search ............. 198/571, 198/572, 574, 577, 635, 550.2, 550.6; 222/55, 222/56, 63, 412; 177/60
See application file for complete search history.

(56) References Cited

U.S. PATENT DOCUMENTS

| | | | | |
|---|---|---|---|---|
| 2,180,497 A | * | 11/1939 | Barkin | .............. 2/97 |
| 3,165,195 A | | 1/1965 | Sass et al. | |
| 3,430,751 A | * | 3/1969 | Bateson | ............ 122/55 |
| 4,038,531 A | * | 7/1977 | Loe, Jr. | ............ 222/57 |
| 4,071,102 A | * | 1/1978 | Van Ostenbridge et al. | ... 222/55 |
| 4,232,781 A | | 11/1980 | Muller | |
| 4,233,255 A | | 11/1980 | Moon | |

(Continued)

FOREIGN PATENT DOCUMENTS

GB 854215 11/1960

(Continued)

OTHER PUBLICATIONS

Henttonen; "Application of Advanced Adjustment Methods in Process Industry"; Finnish Society of Automation; pp. 79-82; 1992.

*Primary Examiner*—James R Bidwell
(74) *Attorney, Agent, or Firm*—Oliff & Berridge, PLC

(57) ABSTRACT

A method and an apparatus for controlling feeding of solid matter in a process with at least one solid matter unloading point, at least one belt conveyor and at least one solid matter feeding point, solid matter being unloaded in the unloading point from solid matter storage to a belt conveyor arranged to convey the solid matter either directly or via at least one other belt conveyor to the feeding point. In the unloading point, the unloading of the solid matter to the belt conveyor is controlled in such a way that the thickness of the material bed follows a set value determined for it; and in the feeding point, the amount of solid matter to be fed is controlled by controlling the speed of the belt conveyor.

22 Claims, 2 Drawing Sheets

Figure 1:
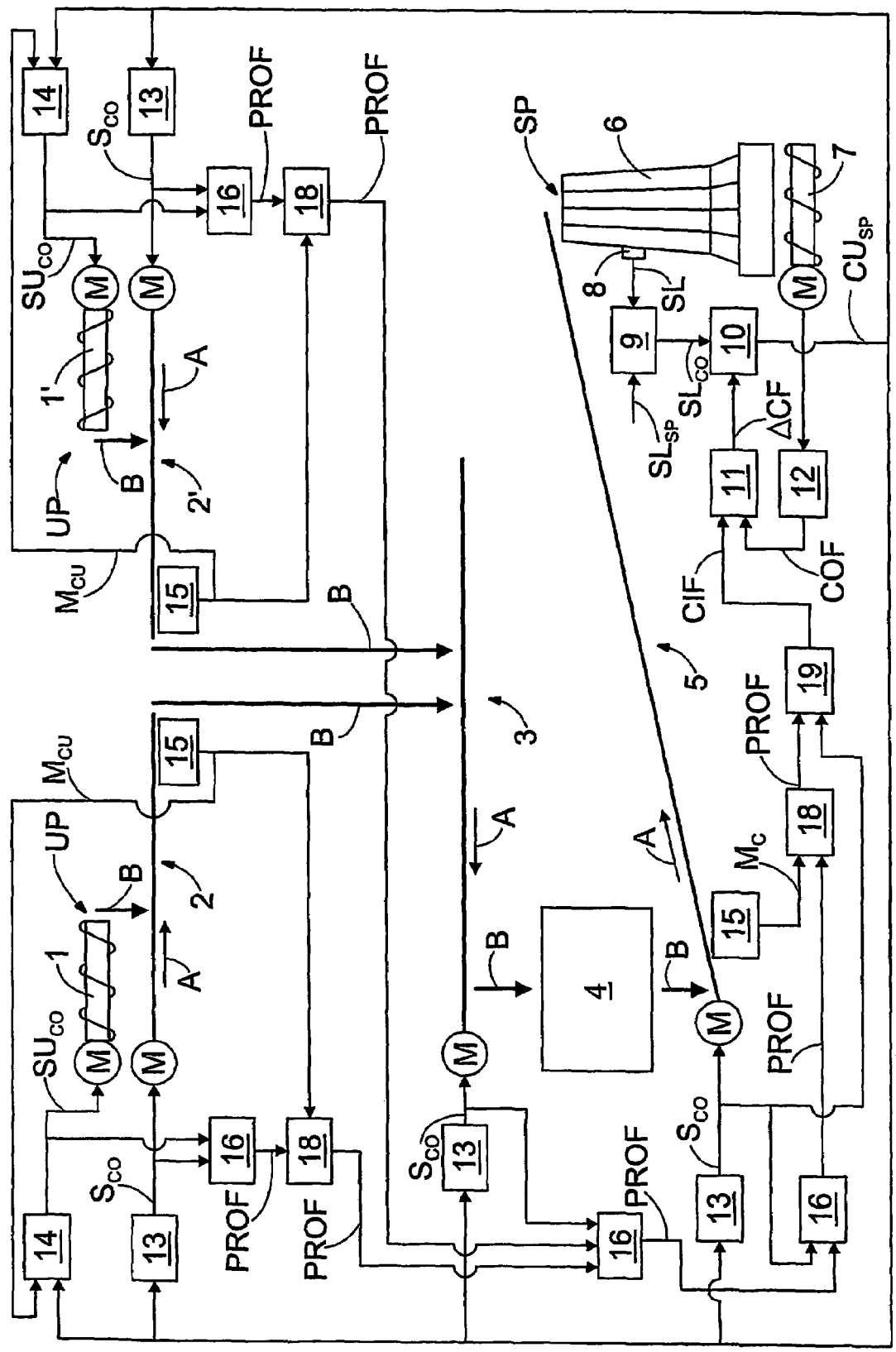

U.S. PATENT DOCUMENTS 4,595,125 A     6/1986   Alwerud
4,895,081 A *   1/1990   Homer et al. ............ 198/502.2
6,621,014 B1 *  9/2003   Tanner et al. ................. 222/77

FOREIGN PATENT DOCUMENTS

| | | | |
|---|---|---|---|
| GB | 2 136 754 A | 9/1984 | |
| GB | 2 180 497 A | 4/1987 | |
| SU | 697981 | 11/1979 | |
| SU | 831690 | 5/1981 | |
| SU | 984487 | 12/1982 | |
| SU | 1189756 A | 11/1985 | |

* cited by examiner

CONTROLLING FEEDING OF SOLID MATTER

FIELD OF THE INVENTION

The invention relates to a method for controlling feeding of solid matter in a process which comprises at least one unloading point for solid matter, at least one belt conveyor and at least one feeding point for solid matter, solid matter being unloaded in the unloading point from solid matter storage to a belt conveyor, which is arranged to convey said solid matter either directly or via at least one other belt conveyor to the feeding point.

Further, the invention relates to an apparatus for controlling feeding of solid matter in a process which comprises at least one unloading point for solid matter, at least one belt conveyor and at least one feeding point for solid matter, solid matter being arranged to be unloaded in the unloading point from solid matter storage to a belt conveyor, which is arranged to convey said solid matter either directly or via at least one other belt conveyor to the feeding point.

BACKGROUND OF THE INVENTION

Systems treating a material flow of solid matter, which comprise one or more unloading points where one or more unloaders unload solid matter from storage to one or more conveyors which convey said matter to a feeding point where said solid matter is either actively guided with separate feeding devices away from the conveyor and forwards in the process or where the solid matter passively discharges from the conveyor, are used in connection with a large number of different processes. Such systems treating a material flow of solid matter are used in, for instance, treating processes of the raw material in chemical pulp manufacture, in fuel feeding in power plants using solid fuel and in rock-crushing plants. Chemical pulp manufacture utilizes one or more chip kinds or grades, which are usually stored outdoors in heap or clamp storage. From such storage, the chips are unloaded to belt conveyors, which convey the chips to a chip silo functioning as intermediate storage, from which chips are fed at a desired speed to a chemical pulp cooking process. In power plants using solid matter, a fuel, such as peat or chips, is unloaded from storage to conveyors, which convey the fuel to the fuel feeding of power boilers. The fuel feeding to power boilers can be implemented in a plurality of ways, for example in such a way that there is a separate conveyor for the feed of each power boiler, or that fuel is fed to several power boilers with one conveyor, in which case separate feeding devices are arranged in connection with the conveyor for feeding fuel to each power boiler. In rock-crushing plants, the rock material is unloaded either directly in the quarrying location or from a heap serving as intermediate storage to the conveyor, which transfers the quarry-run rock to a crusher, from where the crushed material is transferred forwards.

A prerequisite for the efficient operation of all the above-mentioned and similar processes is that the amount of solid matter to be fed from the conveyor system onwards to solid matter intermediate storage or the amount of solid matter to be fed to a process treating solid matter is right. For example, from the viewpoint of appropriate operation of a chemical pulp cooking process, it is important for the surface of the chip silo to remain at correct level or at least within an allowed variation range. In order to guarantee efficient energy production, the amount of fuel to be fed to the boiler, in turn, must be neither too small nor too large. Likewise, the amount of quarry-run rock to be fed to a rock-crushing process must be sufficiently large in order for the crusher to operate at full power, but still sufficiently small so as not to clog the crusher.

The amount of chips to be fed to a chip silo of a chemical pulp cooking process has conventionally been controlled by adjusting the speed of chip unloading from clamp or heap storage to a belt conveyor with a level controller based on measuring the surface level of the chip silo. However, the problem with this solution is that there is a delay corresponding to the whole length of the conveyor system in the control circuit of the level controller, whereby the control circuit of the chip feeding is naturally very slow. There are also solutions in which the conveyor system is equipped with control drives, whereby not only the speed of the chip unloading but also the speed of the conveyors can be controlled with the same message arriving from the level controller and being based on measuring the chip silo surface level. However, due to control-driven conveyors, the delay length of the conveyor system varies, whereby the chip flow from the conveyor system after the delay does not correspond to the chip flow at the beginning of the conveyor system. In addition, when using an unloader moving in parallel in the direction of travel of the conveyor belt, the variation of the chip unloading point causes a changing delay. The problem with these solutions in use is further that disturbances in chip unloading, such as variation in th e quality of chips coming form the storage area, due to clods caused by the freezing of chips, for example, are carried along through the whole conveyor system without being weakened. Further, with some apparatus combinations and performance requirements, a satisfactory or even stable control solution cannot be found to control the amount of chips to be fed to the chip silo.

In chip feeding, it is also known to use 3-point control, whereby both a level controller and a flow rate controller are used for controlling the amount of chips to be fed to the chip silo. The level controller determines the difference variable between the surface level of the chips in the silo and the set value of the surface level, and forms an output variable on the basis this, the output variable being fed as one input variable to the flow rate controller. The output variable of the flow rate controller is used to adjust the speed of the chip unloading and/or the speed of the conveyors. A second input variable of the flow rate controller is formed by the difference between the chip flow incoming to the silo and the chip flow discharging from the silo. The chip flow discharging from the silo can be determined based on the speed of the unloader at the bottom of the silo. However, the chip flow incoming to the silo at each particular moment of time is not known very accurately due to the variety of problems mentioned above, and therefore it is not possible to implement accurate control of chip feeding with 3-point control either.

Further, SU publication 984 487 discloses a method for stabilizing the amount of material in the crusher chamber of a crusher on the basis of the amount of crushed material and the amount of material going to the crusher. SU publication 697 981 discloses a method for controlling fuel feeding in coal-burning power plants where fuel is fed to a feed conveyor from several different silos. According to the method, the aim is to regulate the amount of fuel fed from different silos in such a way that the fuel surfaces in different silos would stay at the same level at the same time as the total amount of fuel fed to the feed conveyor is kept desired. Further, a method is known in which the aim is to stabilize the amount by weight of the fuel fed via a conveyor. According to the solution, the amount by weight of the fuel on the conveyor is calculated on the basis of the weight of the fuel on the conveyor belt and the speed of the conveyor. If the fuel weight varies, for instance when the fuel moisture or density changes, the speed of the conveyor is changed so that the amount by weight of the fuel to be fed remains constant. A prerequisite for the functioning of the method is that the conveyor is provided with load cells, by means of which the weight of the fuel to be fed is continuously measured.

BRIEF DESCRIPTION OF THE INVENTION

An object of the present invention is to provide a solution of a new type for controlling feeding of solid matter, owing to which feeding of solid matter can be controlled more accurately than previously in processes comprising a belt conveyor.

The method according to the invention is characterized by determining a set value for the thickness of a material bed formed of the solid matter to be unloaded to the belt conveyor; controlling the unloading of the solid matter to the belt conveyor in the unloading point in such a way that the thickness of the material bed follows said set value; and controlling in the feeding point the amount of solid matter to be fed by controlling the speed of the belt conveyor.

The apparatus according to the invention is characterized in that the apparatus is arranged to determine a set value for the thickness of a material bed formed of the solid matter to be unloaded to the belt conveyor; to control the unloading of the solid matter to the belt conveyor in the unloading point in such a way that the thickness of the material bed follows said set value; and to control the amount of solid matter to be fed in the feeding point by controlling the speed of the belt conveyor.

According to the essential idea of the invention, in a process, which comprises at least one solid matter unloading point, at least one belt conveyor and at least one solid matter feeding point and in which unloading point solid matter is unloaded from solid matter storage to a belt conveyor arranged to transport said solid matter to the feeding point either directly or via at least one other belt conveyor, the feeding of solid matter is controlled in such a way that a set value is determined for the thickness of the material bed formed of the solid matter unloaded to the belt conveyor; the unloading of solid matter to the belt conveyor is controlled in the unloading point in such a way that the thickness of the material bed follows said set value; and that the amount of solid matter fed in the feeding point is controlled by controlling the speed of the belt conveyor. According to an embodiment of the invention, solid matter is fed in the feeding point to solid matter intermediate storage or storage tank or a solid matter treating process, from which intermediate storage or storage tank said solid matter is unloaded for further treatment, or said solid matter discharges passively for further treatment, or in which treatment process said solid matter is treated further. According to a second embodiment of the invention, the thickness of the material bed formed of solid matter is the mass of the solid matter per length unit of the belt conveyor, the volume of the solid matter per length unit of the belt conveyor or the cross-sectional area of the material bed formed of solid matter. According to a third embodiment of the invention, the set value of the thickness of the material bed of the solid matter unloaded to the belt conveyor is a permanently fixed constant value. A fourth embodiment of the invention comprises defining, on the basis of the speeds of the belt conveyor and the unloader, a material bed profile expressing variation in the thickness of the material bed of the solid matter on the belt conveyor in the longitudinal direction of the belt conveyor. A fifth embodiment of the invention comprises combining solid matter kind or grade information with said profile expressing variation in the thickness of the material bed. According to a sixth embodiment of the invention, the solid matter is formed of chips and the intermediate storage is a chip silo or a chip hopper.

An advantage of the invention is that when the aim is to keep the thickness of the material bed of the solid matter on the conveyors constant, the amount of matter to be fed can be controlled easily and accurately only by changing the speed of the conveyors. Adjusting the thickness of the material bed to be constant eliminates, at the same time, delays in the conveyor system, and weakens disturbances carried along through the whole conveyor system. The profile of the material bed formed of solid matter on conveyors allows determination of the material flow of solid matter at arbitrary points on the conveyor, whereby, when the material flow is formed of material of several different kinds and/or grades, the relations between different kinds and/or grades of the solid matter are known at arbitrary points on the conveyor.

BRIEF DESCRIPTION OF THE INVENTION

Figure 2:
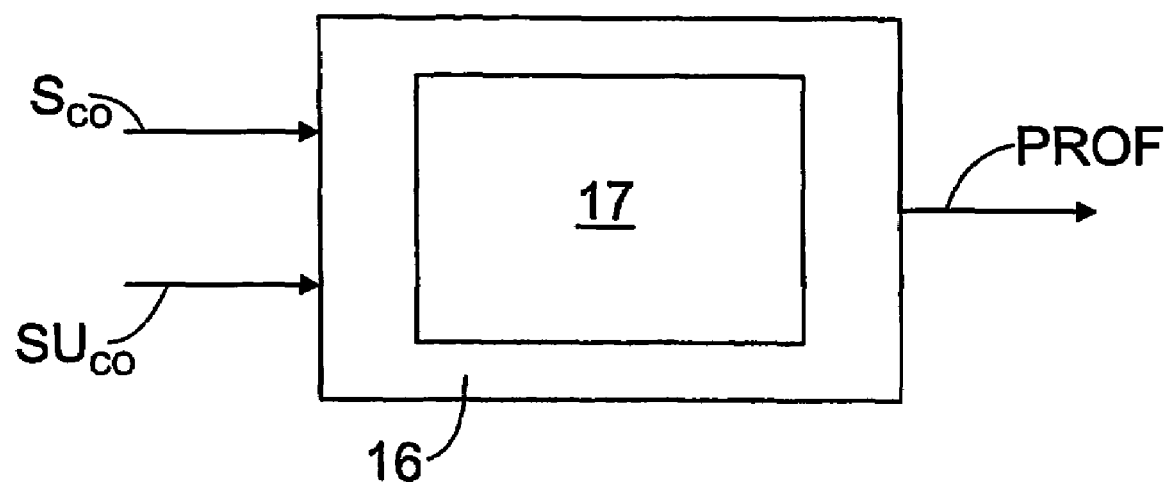

The invention will now be described in greater detail in the attached drawings, of which FIG. 1 shows schematically a process in which the presented solution for controlling feeding of solid matter is used; and FIG. 2 shows schematically a detail of a calculating member used in one embodiment of the presented solution.

DETAILED DESCRIPTION OF THE INVENTION

FIG. 1 shows schematically a process in which the presented solution for controlling feeding of solid matter is used. The process shown in FIG. 1 is a chip-feeding process in connection with chemical pulp manufacture. The process according to FIG. 1 comprises unloaders 1 and 1' or dispensers 1 and 1', which unload or dispense the chips stored in heap or clamp storage in an unloading point UP to conveyors 2 and 2'. For the sake of clarity, said heap or clamp storage or the chip material itself is not shown in FIG. 1. The unloaders 1 and 1' are typically screw unloaders, which may, depending on the shape of the chip storage, be either unloaders travelling in parallel in the direction of the storage or unloaders rotating about their one end. The chips to be unloaded to the conveyors 2 and 2' may, in turn, be either of the same kind of wood or their kind may differ from each other; in other words, the chips in the storage may be of the same kind of wood or of different kinds of wood. Further, the chips to be unloaded to the conveyors 2 and 2' may be of different kinds, for instance in such a way that one part of the chips is saw chips and another part is chips of the process's own chip line. From the conveyors 2 and 2' the chips are unloaded to a common conveyor 3, on which the chips from different conveyors are mixed with each other and from which the mixed chip flow is transferred to a feed conveyor 5 transporting the chips to a feeding point SP, where the chips are fed from the conveyor to a chip silo 6 functioning as intermediate storage for the chips. Between the common conveyor 3 and the feed conveyor 5, a screening plant 4 is shown, which separates from the chip flow those chips that have too large a piece size for chemical pulp manufacture to be re-treated. At the bottom of the chip silo 6, there is an unloader 7, which unloads the chips from the silo 6 onwards to the chemical pulp manufacturing line. The conveyors 2, 2', 3 and 5 are typically trough-like belt conveyors, the side rollers of which usually have an inclination of 30 to 45°. In FIG. 1, the direction of travel of the conveyors is shown by arrows A and the chip flow forwards in the process is shown by arrows B.

For the sake of clarity, FIG. 1 shows only two chip unloading points UP, but in practice there may be one or more chip storages and unloading points UP depending on the kind of chemical pulp to be manufactured. Motors operating unloaders and conveyors are generally denoted as M, although the types and powers of the motors usually deviate from each other. Although FIG. 1 shows several unloaders and conveyors, the process may, at its simplest, comprise only one unloader and one conveyor.

In the example of FIG. 1, the solution for controlling feeding of chips is connected to 3-point control used in connection with the chip silo 6. The 3-point control comprises a level controller 9, which determines a difference variable $\Delta SL$ between a chip surface level SL measured by a level-measuring sensor 8 in connection with the chip silo 6 and a set value $SL_{SP}$ of the surface level. On the basis of the difference variable $\Delta SL$, the level controller 9 determines an output variable $SL_{CO}$, which is fed as one input variable to a flow rate controller 10. A second input variable of the flow rate controller 10 is formed by a difference variable $\Delta CF$, determined in a calculating member 11, between a chip flow CIF incoming to the chip silo 6 and a chip flow COF exiting from the chip silo 6. The chip flow COF exiting from the silo 6 is determined on the basis of the speed of the unloader 7 at the bottom of the silo 6, the chip flow CIF incoming to the silo 6 being determined on the basis of the speed of the feed conveyor 5 and the thickness of the chip bed on the conveyor at the final end of the conveyor. The flow controller 10 determines, on the basis of the variables $\Delta CF$ and $SL_{CO}$, an amount target $CU_{SP}$ for chip unloading, on the basis of which the chip unloading is controlled. Thus, the variable $CU_{SP}$ is, at the same time, a set value for the amount of chips to be fed to the chip silo 6.

According to the solution, chip unloading is controlled on the basis of the variable $CU_{SP}$ expressing the amount target for the chip unloading in such a way that the aim is to keep the thickness of the chip bed to be unloaded to the conveyors 2 and 2' constant all the time. Thus, the thickness of the chip bed travelling forwards on each conveyor in the conveyor system remains constant, whereby the amount of chips to be fed to the chip silo 6 can be primarily controlled by changing the speed of the feed conveyor 5. What follows from a change in the speed of the feed conveyor 5 is, in turn, that the speed of both other conveyors and the unloaders 1 and 1' must be changed correspondingly so as to keep the thickness of the chip bed unloaded to the conveyors constant. Thus, if the amount of chips required for the chip silo 6 increases, the speed of the feed conveyor 5 is increased, based on which also the speed of the conveyors 2, 2' and the common conveyor 3 is increased in such a way that the thickness of the chip bed on the conveyors remains constant. Correspondingly, if the amount of chips required for the silo decreases, the speed of the feed conveyor 5 is decreased, but at the same time, also the speed of the conveyors 2, 2' and the common conveyor 3 as well as the speed of the unloaders 1 and 1' is decreased in such a way that the thickness of the chip bed on the conveyors remains constant. Thus, according to the solution, the conveyor system is regarded as a tube in which the chips form what is called a plug flow, which fills the whole volume of the tube, whereby the chip flow, i.e. the chip feeding to the chip silo 6 can be controlled accurately by controlling the speed of the conveyors. Since chips of different kinds can be conveyed on the conveyors 2 and 2', it is fully possible that the unloading speed of the unloaders 1 and 1' and/or the speeds of the conveyors 2 and 2' are different.

In this example, the thickness of a material bed formed of solid matter, i.e. chips, refers to the mass of the solid matter per length unit of the conveyor, whereby the unit of thickness is for instance [kg/m], but the thickness of a material bed formed of solid matter may also refer to the volume of material per length unit [m$^3$/m] of the conveyor, i.e., in fact, the cross-sectional area [m$^2$] of the material bed.

The speed S of the conveyors 2 and 2', the common conveyor 3 and the feed conveyor 5 is thus controlled on the basis of the variable $CU_{SP}$ expressing the amount target for the chip unloading, which is, at the same time, a set value for the amount of chips to be fed to the chip silo 6. Therefore, FIG. 1 shows in connection with each conveyor a controller 13, which determines on the basis of the variable $CU_{SP}$ a speed control variable $S_{CO}$ specific for the conveyor in question, in accordance with which the speed of the motor M is controlled in such a way that the amount of chips to be fed to the silo 6 corresponds to the amount target $CU_{SP}$ for the chip unloading. Since the conveyors 2 and 2', the common conveyor 3 and the feed conveyor 5 are located at different points of the process and convey different amount of chips, it is clear that the internal operation of the controllers 13 shown in FIG. 1 differ from each other, because for each conveyor a speed control variable $S_{CO}$ must be calculated that corresponds to this particular conveyor. For the sake of clarity, however, the controllers are denoted with the same reference numeral 13, because their operating principles and objects correspond to each other. Correspondingly, also the unloading speed SU of the unloaders 1 and 1' are thus controlled on the basis of the variable $CU_{SP}$ expressing the amount target for the chip unloading. For this purpose, FIG. 1 shows, in connection with both unloaders 1 and 1', a controller 14, which is arranged to determine the control variable $SU_{CO}$ of the unloading speed SU of the unloader in such a way that irrespective of the speed of the conveyor to which the chips are unloaded, a chip bed of constant thickness is formed on the conveyor in question; in other words, when changing the speed S of the conveyor, also the unloading speed SU of the unloader is changed. The set value $C_{SP}$ of the thickness of the chip bed to be unloaded to the conveyors 2 and 2' is determined on the basis of the total amount of chips to be fed to the chip silo 6 and the amount of chemical pulp to be manufactured. The set value $C_{SP}$ of the thickness of the chip bed may vary from time to time due to different speed control areas of conveyors, for example, but it may also be a permanently fixed constant value, which is determined fixedly within the controller 14, for instance. It is obvious that since the unloaders 1 and 1' may unload chip kinds or grades differing from each other, the amount of chips unloaded with the unloaders 1 and 1' may be different from each other. For the sake of clarity, however, the controllers are denoted with the same reference numeral 14, because their operating principles and objects correspond to each other.

An advantage of the solution is that it is simple and easy to implement, because when the aim is to keep the thickness of the chip bed on the conveyors constant, the amount of chips to be fed to the chip silo 6 can be controlled only by changing the speed of the conveyors in the chip treating process, because then the amount of chips to be fed to the chip silo 6 is directly proportional to the speed of the conveyors. Adjusting the thickness of the chip bed to be constant also eliminates the delays in the conveyor system, because the amount of chips to be fed can be controlled quickly and accurately by changing the speed of the conveyors. Since changing the bed thickness is, with regard to the level control of the chip silo 6, a disturbance, adjusting the thickness of the chip bed to be constant also weakens these disturbances carried along through the conveyor system.

In the above solution, it is assumed that the efficiency coefficients of the unloaders 1 and 1' remain constant all the time, in other words that the unloaders 1 and 1' continuously unload such an amount of chips that is according to the their control variable $SU_{CO}$. Since the efficiency coefficient of the unloaders may, however, vary from several different reasons, such as due to the clodding of the chips in winter, also the measured weight of the chips unloaded to the conveyors can be taken into account in the speed control of the unloaders 1 and 1'. In the solution of FIG. 1, this is implemented by means of belt weighers 15 arranged in connection with the conveyors 2 and 2'. The belt weighers 15 measure the weight $M_{CU}$ of the chips travelling on the conveyors 2 and 2', this variable being taken to the controller 14 controlling the thickness of the chip bed. If the measured chip weight $M_{CU}$ does not correspond to the value that it should be on the basis of the speed variable $SU_{co}$ of the unloader, the operation of the unloaders 1 and 1' may be controlled on the basis of the measured weight $M_{CU}$ of the chip bed in such a way that the thickness of the chip bed corresponds to the desired value.

When it is desired that the amount of chips incoming to the chip silo 6 in the near future be known in advance, the thickness of the chip bed on the conveyors can be determined on the basis of the relation of the speeds of the unloaders 1 and 1' and the conveyors 2, 2', 3 and 5. The thickness of the chip bed on the conveyors 2, 2', 3 or 5 is stored to a chip bed profile PROF expressing the chip bed thickness taking place in the longitudinal direction of the conveyor, which profile PROF is updated continuously and scrolled with the same pace as the conveyors. The calculation of the profile is performed in a calculating member 16. FIG. 2 shows schematically the internal structure of the calculating member 16 used in the calculation of the profile of the chip bed on the conveyors 2 and 2'. The calculating member 16 comprises a buffer memory 17, to which the profile PROF is stored and where the profile PROF is scrolled forwards with the same pace as the conveyor. FIG. 1 shows, in connection with each conveyor, a calculating member 16, which determines the profile of the chip bed travelling on the conveyor in question. The profile information on the chip bed corresponding to each conveyor is transferred to the conveyor that is next each particular time in the direction of travel of the chip flow. For example, the profile information on the chip bed on the conveyors 2 and 2' is used in determining the profile of the chip bed travelling on the common conveyor 3, which, in turn, is used in determining the profile of the chip bed travelling on the feed conveyor 5. Again for the sake of clarity, the calculating members calculating the profiles of the chip beds travelling on the different conveyors are denoted with the same reference numeral 16 in FIG. 1, because their objects correspond to each other, although it is naturally obvious that their internal operations somewhat differ from each other, depending on their location in the conveyor system.

The chip bed profile determined in the calculating member 16 can also be corrected on the basis of the measuring results given by the belt weighers 15. Such correction of the chip bed profile can be implemented in calculating members 18 shown in FIG. 1. The profile of the chip bed on the feed conveyor 5 is determined on the basis of the chip weight $M_C$ measured by the belt weigher 15 positioned at the starting end of the conveyor. The determined profile is further used with the speed of the feed conveyor to determine the chip flow at the starting end of the feed conveyor 5. The chip flow at the starting end of the feed conveyor 5 is determined in the calculating member 19. By means of the chip bed profile the known chip flow at the final end of the feed conveyor 5 is used, in turn, to express the chip flow incoming to the chip silo 6.

On the basis of the profile PROF and the momentary speed of the conveyor, a chip flow can be determined at an arbitrary point of the conveyor, even if the speed of the conveyor had meanwhile changed. Using a profile PROF expressing variation in the chip bed thickness is particularly advantageous when the set value of the chip bed thickness must be changed for some reason. In the same way, the amount of chips travelling on the common conveyor can be calculated at the meeting point of the conveyors on the basis of the profiles of the chip flows on the conveyors 2 and 2'. By means of the chip flow profiles PROF a delay in the level control of the chip silo 6 is eliminated, because the material flow at the final end of the conveyor system can be determined by means of the profiles PROF. When there is no delay, there is no stability problem, and the control can be structured to be quick.

The chip bed profile PROF thus expresses variation in the chip bed thickness, i.e. variation in the amount of chips on the conveyor in the longitudinal direction of the conveyor. Since the kinds or grades of the chips to be unloaded to the conveyors may vary, information on the kind and/or grade of the chips travelling on the conveyor may be combined to the chip bed profile PROF expressing the variation in the thickness of the chip bed on the conveyor, in which case the interrelation of the different chip kinds and/or grades is known all the time at an arbitrary point of the conveyor.

The example of FIG. 1 relates to the control of feeding solid matter according to the invention in a chip treatment process for chemical pulp manufacture, but the invention can be utilized correspondingly in other processes of treating a solid matter flow. One example of such a process is feeding solid fuel to a power boiler in power plants using solid fuel. A second example could be feeding of rock material, concrete, asphalt or the like material to a crushing or screening process, storage or mixing process, where crushed rock materials having several different grain sizes are mixed with each other. Crushing may be carried out with a crushing machine which comprises, for instance, a primary crusher comprising a jaw crusher or a primary gyratory crusher and/or a secondary crusher comprising a cone or impact crusher. In the screening process, screening of the crushed material may be carried out with, for instance, a vibrating or drum screen, while storage silos may be used for storing. Instead of a belt conveyor, for instance an apron conveyor may be used for treatment of rock. Advantages of the solution in the feed of power boilers and in crushing and/or screening processes of rock material as well as in storage correspond to those achieved in a chip treatment process presented in the example.

All in all, the presented solution enables very accurate control of a material flow of solid matter at the final end of the conveyor system. It is advantageous to show the profile of the material flow also on the display used by the operator who monitors the conveyor system. The display thus shows the structure of the conveyor system graphically, whereby the proceeding of the material flow in the conveyor system can be easily illustrated for the system operator, which facilitates the operator's work when the process is started and terminated and when there are disturbances. Further, controlling special cases, such as changes in the speed of the material flow or disturbances occurring in unloading, becomes easier and is realized partly owing to the control structure.

The drawings and the related specification are only intended to illustrate the idea of the invention. The details of the invention may vary within the scope of the claims. Thus, although according to FIG. 1 all controllers and calculating members are decentralized devices and units separate from each other, it is obvious that their functions can be combined to be implemented with common devices, even to such an extent that the whole conveyor system and the unloaders can be controlled and monitored via one centralized process computer, if required. The processing of measurement information and determination of control variables required for the solution are preferably performed with software, although solutions implemented merely at hardware level can also be used. Furthermore, it is obvious that although in the above example the solution for controlling solid matter is connected to 3-point control of a chip silo, the solution can naturally be used with other control principles as well.

The invention claimed is:

1. A method for controlling feeding of solid matter in a process which comprises at least one unloading point for the solid matter, at least one belt conveyor and at least one feeding point for the solid matter, the solid matter being unloaded in the unloading point from solid matter storage to a belt conveyor, which is arranged to convey said solid matter either directly or via at least one other belt conveyor to the feeding point, comprising
   determining a set value for a thickness of a material bed formed of the solid matter to be unloaded to the belt conveyor;
   controlling the unloading of the solid matter to the belt conveyor in the unloading point in such a way that the thickness of the material bed follows said set value;
   determining a material bed profile expressing variation in the thickness of the material bed in a longitudinal direction of the belt conveyor;
   determining a material flow travelling on the belt conveyor on the basis of said profile; and
   controlling in the feeding point an amount of the solid matter to be fed by controlling a speed of the belt conveyor.

2. A method according to claim 1, wherein feeding the solid matter in the feeding point to a solid matter intermediate storage, a storage tank or a solid matter treatment process, from the intermediate storage or the storage tank said solid matter is unloaded for further treatment, or said solid matter discharges passively for further treatment, or in which the treatment process of said solid matter is treated further.

3. A method according to claim 1, wherein the thickness of the material bed formed of the solid matter being a mass of solid matter per length unit of the belt conveyor, a volume of solid matter per length unit of the belt conveyor or a cross-sectional area of the material bed formed of the solid matter.

4. A method according to claim 1, wherein
   determining an amount target for the solid matter to be fed to a intermediate storage, a storage tank or a treatment process on the basis of an amount of the solid matter discharged from the intermediate storage or an amount of the solid matter treated in the treatment process;
   controlling the amount of the solid matter to be fed in the feeding point on the basis of the amount target for the solid matter by adjusting the speed of the belt conveyor on the basis of the amount target for the solid matter; and
   controlling an unloading speed of the solid matter unloaded to the belt conveyor in the unloading point on the basis of the speed of the belt conveyor in such a way that the thickness of the material bed formed of the solid matter unloaded to the belt conveyor follows the set value set for the material bed thickness.

5. A method according to claim 1, wherein the set value of the thickness of the material bed of the solid matter unloaded to the belt conveyor being a permanently fixed constant value.

6. A method according to claim 1, wherein defining the profile expressing variation in the thickness of the material bed of the solid matter on the belt conveyor in the longitudinal direction of the belt conveyor on the basis of the speed of the belt conveyor and a speed of a unloader.

7. A method according to claim 6, wherein defining a variable expressing a weight of the solid matter on the belt conveyor; and updating the profile of the material bed formed of the solid matter at a particular point of the belt conveyor on the basis of the variable expressing the weight of the solid matter on the belt conveyor.

8. A method according to claim 6, wherein combining solid matter kind and/or grade information with the profile expressing variation in the thickness of the material bed of the solid matter on the belt conveyor in the longitudinal direction of the belt conveyor.

9. A method according to claim 1, wherein the solid matter being of chips and a intermediate storage being a chip silo.

10. A method according to claim 1, wherein the solid matter being solid fuel and a solid matter treating process being a power boiler, where the solid matter is combusted for producing energy.

11. A method according to claim 1, wherein the solid matter being of rock, concrete and/or asphalt and a solid matter treating process being a crushing, screening and/or mixing process.

12. An apparatus for controlling feeding of solid matter in a process which comprises at least one unloading point for the solid matter, at least one belt conveyor and at least one feeding point for the solid matter, the solid matter being arranged to be unloaded in the unloading point from solid matter storage to a belt conveyor, which is arranged to convey said solid matter either directly or via at least one other belt conveyor to the feeding point, wherein the apparatus is arranged
   to determine a set value for a thickness of a material bed formed of the solid matter to be unloaded to the belt conveyor;
   to control the unloading of the solid matter to the belt conveyor in the unloading point in such a way that the thickness of the material bed follows said set value;
   to determine a material bed profile expressing variation in the thickness of the material bed in a longitudinal direction of the belt conveyor;
   to determine a material flow travelling on the belt conveyor on the basis of said profile; and
   to control an amount of the solid matter to be fed in the feeding point by controlling a speed of the belt conveyor.

13. An apparatus according to claim 12, wherein in the feeding point the solid matter is arranged to be fed to a solid matter intermediate storage, a storage tank or a solid matter treatment process, from the intermediate storage said solid matter is arranged to be unloaded or said solid matter is arranged to discharge passively for further treatment, or in the treatment process of said solid matter is arranged to be treated further.

14. An apparatus according to claim 12, wherein the thickness of the material bed formed of the solid matter is a mass of solid matter per length unit of the conveyor, a volume of solid matter per length unit of the belt conveyor or an area of the cross-section of the material bed formed of the solid matter.

15. An apparatus according to claim 12, wherein the apparatus is arranged to determine an amount target for the solid matter to be fed to a intermediate storage or a treating process on the basis of an amount of the solid matter exiting from the intermediate storage or storage tank or an amount of the solid matter treated in the treatment process;
   the apparatus is arranged to control the amount of solid matter to be fed in the feeding point by adjusting the speed of the belt conveyor on the basis of the amount target for the solid matter; and that the apparatus is arranged to control a unloading speed of the solid matter unloaded to the belt conveyor in the unloading point on the basis of the speed of the belt conveyor in such a way that the thickness of the material bed formed of the solid matter unloaded to the belt conveyor follows the set value set for the thickness of the material bed.

16. An apparatus according to claim 12, wherein the set value of the thickness of the material bed of the solid matter unloaded to the belt conveyor is a permanently fixed constant value.

17. An apparatus according to claim 12, wherein the apparatus is further arranged to define the profile expressing variation in the thickness of the material bed of the solid matter on the belt conveyor in the longitudinal direction of the belt conveyor on the basis of the speed of the belt conveyor and a speed of an unloader.

18. An apparatus according to claim 17, wherein the apparatus determines a variable expressing a weight of the solid matter on the belt conveyor; and that the apparatus is arranged to update the profile of the material bed of the solid matter being at a given point of the belt conveyor on the basis of the variable expressing the weight of the solid matter on the belt conveyor.

19. An apparatus according to claim 17, wherein the apparatus is arranged to combine solid matter kind and/or grade information with the profile expressing variation in the thickness of the material bed of the solid matter on the belt conveyor.

20. An apparatus according to claim 12, wherein the solid matter is formed of chips and that a intermediate storage is a chip silo.

21. An apparatus according to claim 12, wherein the solid matter is solid fuel and that a treatment process of the solid matter is a power boiler, where the solid matter is arranged to be combusted for producing energy.

22. An apparatus according to claim 12, wherein the solid matter is rock, concrete and/or asphalt and that a solid matter treatment process is a crushing, screening and/or mixing process.

* * * * *